April 8, 1930.　　　　J. GOUGH　　　　1,753,373
LEAF HANDLING MACHINERY
Filed Aug. 15, 1927
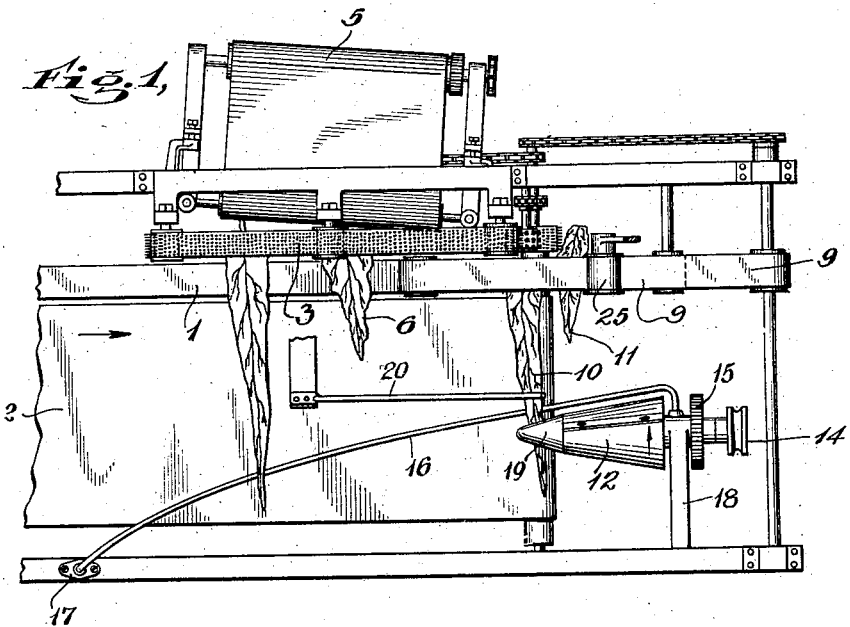
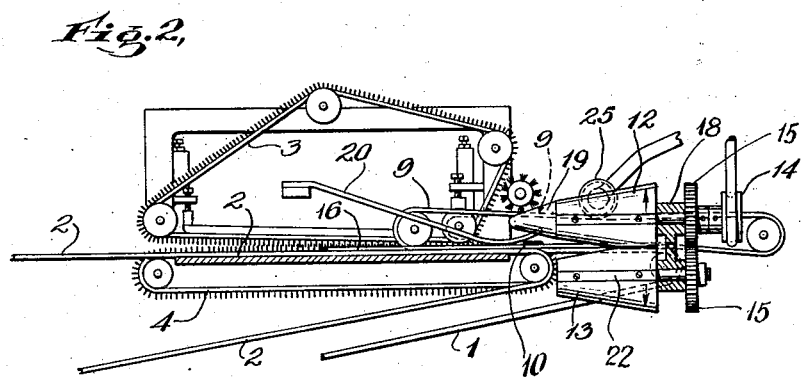
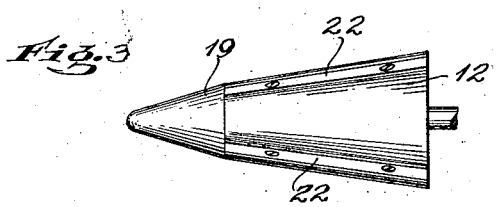
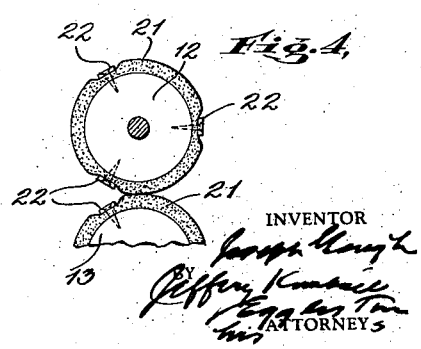
INVENTOR
ATTORNEYS Patented Apr. 8, 1930

1,753,373

UNITED STATES PATENT OFFICE

JOSEPH GOUGH, OF NEWARK, NEW JERSEY, ASSIGNOR TO GOUGH STEMMING MACHINE CORPORATION, OF NEW YORK, N. Y., A CORPORATION OF NEW JERSEY

LEAF-HANDLING MACHINERY

Application filed August 15, 1927. Serial No. 212,912.

In connection with machines for stemming tobacco leaves, it is frequently desirable to provide for separating the leaves properly treated from those which have escaped treatment or which have been incompletely treated. The object of my invention is to provide stemming mechanism having this function.

To this end I provide in co-operation with the mechanism of the stemmer which holds the leaves with their ends projecting, a mechanism for grabbing those leaves which project from the first mechanism, more than a predetermined distance, and depositing them in one place, while the leaves left in the first mechanism are deposited in another place. The first mechanism may be in the form of a continuously moving conveyor, and the second or grasping and pulling mechanism such a one as is capable of functioning while the conveyor is in motion, so that the operation of the separator is a continuous uninterrupted one.

The accompanying drawings illustrate my invention. Fig. 1 is a plan view of the essential elements of a stemming machine with my invention embodied therein. Fig. 2 is an elevation of the same. Fig. 3 is an elevation of one of the separator rollers of the preceding figures. Fig. 4 is a diagrammatic section through the rollers to illustrate their cooperative relation.

In the stemming machine proper, conveyor belts 1 and 2 carry the leaves sidewise to the stemming station, the latter consisting of a pair of cooperating belts 3 and 4 of card clothing and a pair of belts 5 running at substantially right angles to the travel of the conveyor belts. While the blades of the leaves are held by the card belts 3 and 4, and the belts and leaves travel continuously in the direction indicated by the lefthand arrow in Fig. 1, the butts of the stems or long veins are grabbed by the belts 5 and pulled out of the blades; the blades of the properly stemmed leaves are thereby more or less bunched up against the card belts as indicated at 6, while the unstemmed and incompletely stemmed leaves are left projecting farther out as indicated at 10. The exact nature of the stemming machine forms no part of this invention, however.

By my invention the unstemmed and insufficiently stemmed leaves 10 are separated from the properly stemmed leaves 6; to this end, the conveyor belt 1 is extended beyond the stemming station as illustrated at the right of Fig. 2, and I usually add another belt 9, driven at the same speed as belt 1, to press the leaves (both stemmed and unstemmed) onto the belt 1 and hold them there. The belt 9 may extend partly into the stemming station as illustrated to assure the passage of the leaves into the bite of the belts 1 and 9; at 25 is an adjustable idler pulley to adjust the tension of belt 9. These two belts 1 and 9 need not be wide, and the point ends of all the leaves, stemmed as well as unstemmed, may project from these belts after leaving the card belts 3 and 4; the unstemmed or insufficiently stemmed leaves 10 project farther however than the properly stemmed leaves 11 as will be apparent. A pair of rollers 12 and 13, rotating in the direction of the arrows marked on these rollers in Figs. 1 and 2, are placed close enough to the belts 1 and 9 to receive the unstemmed leaves and those regarded as incompletely stemmed, but sufficiently far away from those belts to not receive the ends of the stemmed leaves. These rolls 12 and 13 are positively driven, continuously, as indicated for example by the belt and belt wheel 14 and the meshing gear wheels 15; usually they are driven rather rapidly so as to rather tend to throw the leaves away as they are cast out of their bite. These rolls therefore receive the unstemmed and insufficiently stemmed leaves and pull them out of the belts 1 and 9, depositing them in one place, but leaving the properly stemmed leaves to be passed by the belts 1 and 9 into another place, namely at the end of belt 1. A bar or rod 16, fastened to bracket 17 on the frame and bracket 18 for and at the rear of the rollers 12 and 13, lies on or closely adjacent to the top of conveyor belt 2 so that the ends of the farther-projecting leaves slide above it; this bar or rod therefore forms a bridge for the gap between the belt 2 and the rollers 12 and 13 and supports the ends of these leaves as they pass from belt 2 and causes them to enter between the rollers.

The end of the upper roll 12 to which the leaves first come, is preferably given a conical shape as indicated at 19, the cone extending over but out of contact with the conveyor belt 2, so as to direct the ends of the leaves downwardly into the bite of the rolls; a stationary inclined guide 20 can be added if desired or necessary to assure the passage of the leaf ends underneath the cone 19. Preferably the adjacent end of the lower roll 13 is cut off square, as indicated in Fig. 2, and placed as close as possible to the adjacent end of the conveyor belt 2 so as to shorten as much as possible the distance between the end of this conveyor belt 2 and the beginning of the bite of the rolls 12 and 13.

Ordinarily I make both rolls conical, or at least conical for some distance back of the square-cut or blunt end of roll 13 and in advance of the actual bite of the roll (see Fig. 2), so as to provide an opening between the rolls to freely receive the longer leaves to assure the entry of the leaves between the rolls; back of this opening the surfaces of the rolls are in contact for some distance or are brought so close together as to grip the farther-projecting leaves and pull them from the belts 1 and 9 as described. Ordinarily also I make the bodies of the rolls 12 and 13 of a rather hard material, for example wood, but for the working surfaces I prefer sponge rubber, such as a layer 21 of sponge rubber about three-eights of an inch thick at the biting portions of the rolls; the hard internal (wood) portions of the rolls may be conical in shape, the soft sponge rubber compressing at the bite to provide a bite of considerable length although the shafts and axes of the rolls are laid parallel to each other as illustrated, which is preferred for simplicity of construction. Furthermore, I find it to some advantage to depress the working surfaces of the rolls at intervals so as to relieve the bite of the rolls intermittently, the depressions in the working surfaces of the two rolls being so placed as to come opposite each other as the rolls rotate and leaving distinct, preferably non-gripping, openings between the rolls at the depressions as will be apparaent from Fig. 4. I both secure the depressions and fasten the sponge rubber 21 to the hard bodies of the rolls, by thin iron bars 22, say three per roll equally spaced from each other, drawn down into the sponge rubber by screws as will be apparent from the drawing, the iron bars being drawn so far down into the sponge rubber that the bars do not contact with each other as they come opposite each other in the rotation of the rolls. It will be observed that in effect these bars divide the roll surfaces into an equal number of sections separated and spaced from each other by at least the width of the bars.

It will be understood that my invention is not limited to the details illustrated and described except as appears hereinafter in the claims.

Claims:

1. The combination with leaf stemming mechanism including means against which the blades of the leaves are bunched as the stems of the leaves are extracted and for conveying the leaves from the stemming station, of means for grasping and pulling leaves from said means for conveying the leaves, the means for grasping and pulling the leaves being located out of the path of the properly stemmed leaves but within the path of the remainder of the leaves.

2. The combination with leaf stemming mechanism including means against which the blades of the leaves are bunched as the stems of the leaves are extracted and for conveying the leaves from the stemming station, of rolling means for receiving leaves projecting from said means for conveying the leaves and removing the received leaves therefrom, said rolling means being located out of the path of travel of the properly stemmed leaves but within the path of the remainder of the leaves.

3. The combination with leaf stemming mechanism including means for grasping and pulling the stems from the blades and conveyor means on which the blades are bunched as the stems are pulled out and for conveying the blades from the stemming station, of a pair of co-operating rollers so placed beside said conveyor means as to receive blades projecting therefrom and withdraw the received blades from said conveyor means at an angle to the direction of movement of the conveyor means, said rollers being placed such a distance from said conveyor means that the properly stemmed blades pass the entrance to the bite of the rollers without entering the bite and the remainder of the blades enter the bite.

4. The combination of claim 3 characterized by the fact that said rollers consist of a pair of driven conical rollers disposed to receive blades at their smaller ends.

5. The subject matter of claim 1, characterized by the fact that said grasping and pulling means comprises cooperating rotating members, at least one of which is provided with a depressed portion in its working face, which portion does not engage with the working face of the cooperating rotating member.

6. The subject matter of claim 1, characterized by the fact that said grasping and pulling means comprises a pair of rollers, the upper one of which has a conical end to direct leaves into the bite of the rolls and the adjacent end of the lower one of which rolls terminates substantially at the base of the cone, and that there is a conveyor means to support projecting leaves to a point close to said end of the lower roller.

7. The subject matter of claim 2, characterized by the fact that said rolling means comprises a pair of conical rolls so placed that the leaves enter between the rolls at the smaller ends of the rolls, and that the working faces of said rolls is composed of sponge rubber.

8. The subject matter of claim 1, characterized by the fact that said grasping and pulling means comprises a pair of conical rolls so placed that the leaves enter between the rolls at the smaller ends of the rolls, and that the working faces of the rolls are divided into an equal number of sections composed of sponge rubber, the sections of each roll being separated from each other and the spaces between the sections on the two rolls coming opposite each other as the rolls rotate, to relieve the bite.

9. The combination of means for conveying leaves substantially sidewise and through which the stems of the leaves can be pulled but through which the blades can not follow, means at one side of said conveyor means to pull the stems from the blades, a support for the blades at the opposite side of said conveyor means, and means at the latter side of said conveyor means and at the end of said support to pull leaves from said conveyor means, said means to pull leaves from the conveyor means being located out of the path of the properly stemmed blades but within the path of the blades of the other leaves.

10. The combination of claim 9 characterized by the fact that the said means for pulling leaves from the conveyor means is a pair of cooperating driven rollers.

11. The combination of means for conveying leaves substantially sidewise and through which the stems of the leaves can be pulled but through which the blades can not follow, means at one side of said conveyor means to pull the stems from the blades, a supporting surface for the tip ends of the blades at the opposite side of said conveyor, means at the latter side of said conveyor means and at the end of said supporting surface to receive blades and pull the same from said conveyor means, and a bridge for the gap between the supporting surface and the said means for pulling blades from the conveyor means, said pulling means being located out of the path of the properly stemmed blades and within the path of the other blades.

12. The combination of means to grasp and pull the stems from leaves, belt conveyor means including a belt to carry the bodies of the leaves and card clothing in belt form adjacent said stem pulling means, and a pair of cooperating rolls at the end of the carrier of the bodies of the leaves so located with respect to said card clothing that the properly stemmed blades pass the rolls and the others enter the bite of the rolls and thereby are separated from the properly stemmed leaves.

13. The combination of means to grasp and pull the stems from leaves, belt conveyor means including a belt to carry the bodies of the leaves and card clothing in belt form adjacent said stem pulling means, a belt to carry the blades and leaves away from the card clothing, and a pair of cooperating rolls on the opposite side of the last mentioned belt from said stem pulling means, to receive leaf blades and pull them from said last mentioned belt, said rolls being located so far from said belt that the properly stemmed blades pass the rolls and the remainder enter the bite of the rolls.

In testimony whereof, I have signed this specification.

JOSEPH GOUGH.